(12) United States Patent
Kotzur

(10) Patent No.: US 9,081,712 B2
(45) Date of Patent: Jul. 14, 2015

(54) SYSTEM AND METHOD FOR USING SOLID STATE STORAGE SYSTEMS AS A CACHE FOR THE STORAGE OF TEMPORARY DATA

(71) Applicant: Dell Products L.P., Round Rock, TX (US)

(72) Inventor: Gary B. Kotzur, Austin, TX (US)

(73) Assignee: DELL PRODUCTS, L.P., Round Rock, TX (US)

( * ) Notice: Subject to any disclaimer, the term of this patent is extended or adjusted under 35 U.S.C. 154(b) by 235 days.

(21) Appl. No.: 13/723,850

(22) Filed: Dec. 21, 2012

(65) Prior Publication Data

US 2014/0181620 A1 Jun. 26, 2014

(51) Int. Cl.
| G11C 29/00 | (2006.01) |
| G06F 11/10 | (2006.01) |
| G06F 12/02 | (2006.01) |

(52) U.S. Cl.
CPC ........ *G06F 11/1068* (2013.01); *G06F 12/0246* (2013.01); *G06F 2212/7203* (2013.01)

(58) Field of Classification Search
CPC ............ G06F 11/1658; G06F 11/1666; G06F 12/0246; G06F 11/0215; G06F 2212/7203; G06F 12/0804; G06F 12/0893; G11C 5/04; G11C 5/143; G11C 16/30; G11C 5/141; G11C 11/5628; G11C 2211/5643; G11C 16/3418; G11C 16/3427; G11C 16/12; G11C 2216/14

See application file for complete search history.

(56) References Cited

U.S. PATENT DOCUMENTS

| | | | |
|---|---|---|---|
| 6,516,426 B1 * | 2/2003 | Forehand et al. | 714/24 |
| 6,798,599 B2 * | 9/2004 | Dykes et al. | 360/69 |
| 7,039,780 B2 * | 5/2006 | Taussig et al. | 711/165 |
| 8,037,232 B2 * | 10/2011 | Chu | 711/103 |
| 8,239,735 B2 * | 8/2012 | Shalvi et al. | 714/774 |
| 8,614,919 B2 * | 12/2013 | Lee et al. | 365/185.18 |
| 2001/0002479 A1 * | 5/2001 | Asoh | 711/115 |
| 2002/0101677 A1 * | 8/2002 | Dykes et al. | 360/69 |
| 2002/0184459 A1 * | 12/2002 | Taussig et al. | 711/165 |
| 2006/0136656 A1 * | 6/2006 | Conley et al. | 711/103 |
| 2007/0118685 A1 * | 5/2007 | Estakhri | 711/103 |
| 2010/0146186 A1 * | 6/2010 | Traister et al. | 711/103 |
| 2012/0089766 A1 * | 4/2012 | Yu et al. | 711/103 |
| 2012/0246392 A1 * | 9/2012 | Cheon | 711/103 |

* cited by examiner

*Primary Examiner* — Guerrier Merant
(74) *Attorney, Agent, or Firm* — Isidore PLLC

(57) ABSTRACT

A method of storing data includes a storage device controller that receives a storage access operation to store data on at least one non-volatile storage device having a plurality of individually accessible blocks. In response to receiving the storage access operation to store data, the controller initiates a first program cycle to store the data as temporary data within one or more of the blocks. The program cycle has an associated first set of parameters for storage of temporary data. In response to a pre-determined period of time for the storage of temporary data being exceeded or a pre-determined capacity for temporary data has been exceeded, the controller initiates a second program cycle to store the temporary data as persistent data within one or more of the blocks. The second program cycle has an associated second set of parameters for storage of persistent data.

16 Claims, 10 Drawing Sheets

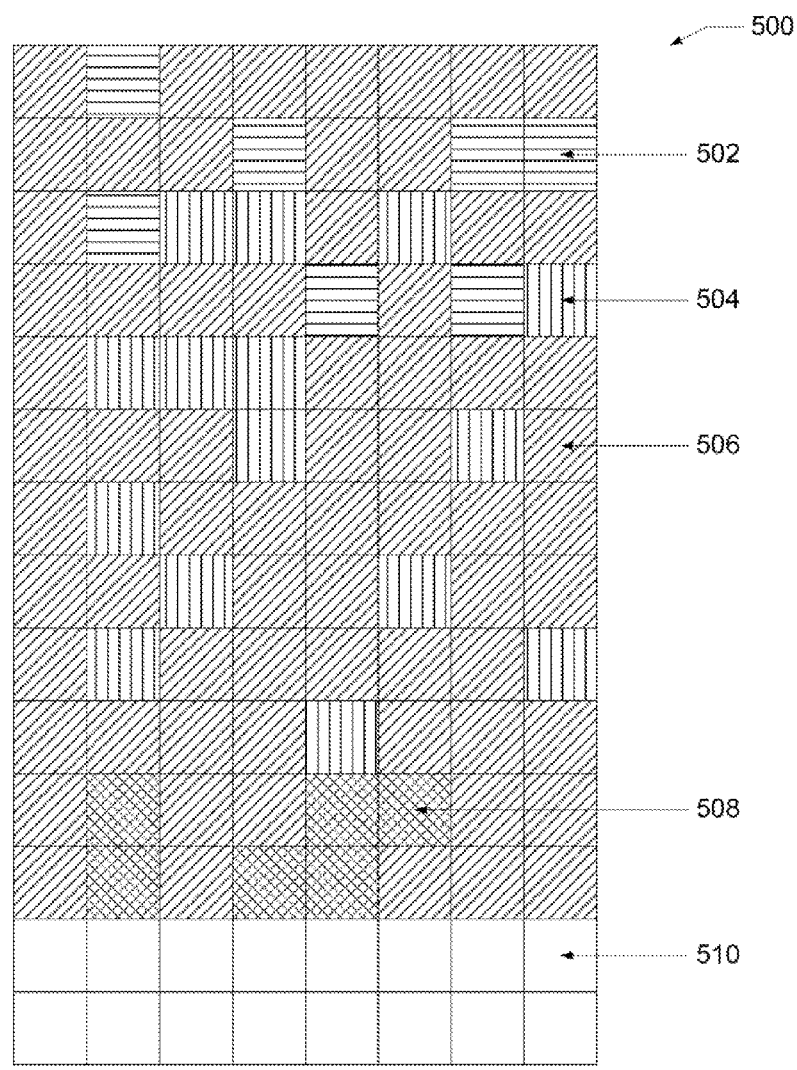
FIG. 5
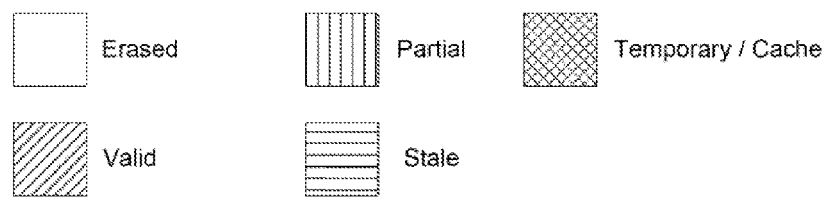

SYSTEM AND METHOD FOR USING SOLID STATE STORAGE SYSTEMS AS A CACHE FOR THE STORAGE OF TEMPORARY DATA

BACKGROUND

1. Technical Field

The present disclosure generally relates to storage devices and in particular to using a solid state storage system as a cache for temporary storage of data.

2. Description of the Related Art

As the value and use of information continue to increase, individuals and businesses seek additional ways to process and store information. One option available to users is information handling systems. An information handling system generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An information handling system can be configured in several different configurations. The information handling system can range from a single, stand-alone computer system to a distributed, multi-device computer system, to a networked computer system with remote or cloud storage systems. The remote or cloud storage systems can include redundant arrays of independent drives (RAID) that use solid state storage devices. Within the computer system or RAID devices are a number of components that include firmware and/or logic and associated storage devices, such as non-volatile random access memory (NVRAM).

While the use of non-volatile random access memory has several advantages such as the long term storage of data without periodic power refreshes, it also has some drawbacks. Non-volatile memory devices have a limited number of write cycles to each cell after which the cell is unusable. Also, each page write may require several write cycles in order to complete the storage of data. While read latency for a non-volatile memory device is approximately on the order of 25 micro-seconds, write latency is much longer at 300 micro-seconds.

Because of the length of the write latency, some solid state storage systems use write buffering/caching to lower latency while improving overall write performance. Since most implementations of write buffering use volatile memory, a method is used to help prevent loss of data during a power failure. The write buffering necessitates the use of extra components such as dynamic random access memories (DRAM) along with a power source such as a battery or large capacity capacitors in order to save the data during a power failure. These extra components increase the cost of the solid state storage system, reduce reliability, and cause inconsistent write performance.

BRIEF SUMMARY

Disclosed is a method, a solid state storage system and an information handling system (IHS) that enables initial storage of data to a permanent storage device as temporary data before subsequently storing the data as permanent or persistent data on the permanent storage device. Accordingly, the permanent storage device can be selectively utilized to provide both temporary data storage and permanent data storage.

According to a first embodiment, a method of storing data includes a storage device controller receiving a storage access operation to store data on at least one non-volatile storage device having a plurality of individually accessible blocks. The controller identifies whether the storage access operation is a write request. In response to the storage access operation being a write request, the controller initiates a first program cycle to store the data as temporary data within one or more of the accessible blocks. The first program cycle has an associated first set of parameters for storage of temporary data. In response to a pre-established period of time for the temporary storage of temporary data being exceeded, the controller initiates a second program cycle to store the temporary data as persistent data within one or more of the accessible blocks. The second program cycle has an associated second set of parameters for storage of persistent data.

According to one embodiment, the method further includes determining or tracking a number of errors that occur during execution of the first program cycle by incrementing a first count of the number of errors during execution of the first program cycle. The first count is compared to a pre-established first number of errors permitted for the storage of temporary data. In response to the first count being greater than the pre-established first number of errors permitted for storage of temporary data, the program cycle is repeated. This process is repeated until the error count decreases below the pre-established number of errors permitted for temporary data.

Also disclosed is a solid-state storage system comprising: at least one non-volatile memory device having a plurality of individually accessible blocks, each of the blocks having a plurality of individually accessible pages; a storage device controller coupled to the non-volatile memory device for controlling storage access operations, the storage controller receiving a storage access operation to store data on the solid state storage system wherein the storage controller comprises logic that: identifies whether the storage access operation is a first-type write request for providing temporary storage of the data; and in response to the storage access operation being the first-type write request, initiating a first program cycle to store the data as temporary data within one or more of the blocks of the non-volatile storage device, wherein the first program cycle has an associated first set of parameters for temporary storage that are different from a second set of parameters for permanent storage within the non-volatile storage device, and wherein the non-volatile storage device provides both permanent data storage and temporary data storage based on a type of write request received to store the data.

According to one embodiment, the solid state storage system further includes the storage device controller comprising logic that: receives at the storage controller a plurality of temporary data parameters associated with at least a portion of the data, wherein the temporary data parameters comprise at least one of a first time period for temporary storage, the pre-established first number of errors permitted for temporary storage, and a selected memory operation of multiple operations that can be performed in response to the controller determining that the pre-established first number of errors permitted for temporary storage of the portion of data has been exceeded, wherein the temporary data parameters allow the storage controller to reduce a number of write cycles to store the portion of data, relative to the number of write cycles required for a permanent storage of data, and wherein the storage controller utilizes at least one page of the non-volatile storage device as a cache memory.

Also disclosed is an information handling system (IHS) comprising: one or more processors; a memory system coupled to the processor and in communication with the processor, the memory system comprising: at least one non-volatile memory device having a plurality of individually accessible blocks, each of the blocks having a plurality of individually accessible pages; and a storage device controller coupled to the non-volatile memory device, the storage controller having firmware executing thereon to provide control of memory system operations wherein the firmware configures the storage controller to: identify whether the storage access operation is a first-type write request for providing temporary storage of the data; and in response to the storage access operation being the first-type write request, initiate a first program cycle to store the data as temporary data within one or more of the blocks of the non-volatile storage device, wherein the first program cycle has an associated first set of parameters for temporary storage that are different from a second set of parameters for permanent storage within the non-volatile storage device, and wherein the non-volatile storage device provides both permanent data storage and temporary data storage based on a type of write request received to store the data.

According to one embodiment, an information handling system (IHS) further includes: the firmware configures the storage controller to: perform a plurality of timed periodic first program cycles to store data as temporary data in order to prevent loss of data during the occurrence of a power failure in the solid state storage system; and responsive to detecting the power failure in the solid state storage system, execute the first program cycle to store all pending data to the storage device as temporary data.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIG. 5 illustrates several types of memory blocks states contained within a non-volatile storage device, according to one or more embodiments;

DETAILED DESCRIPTION

Figure 1:
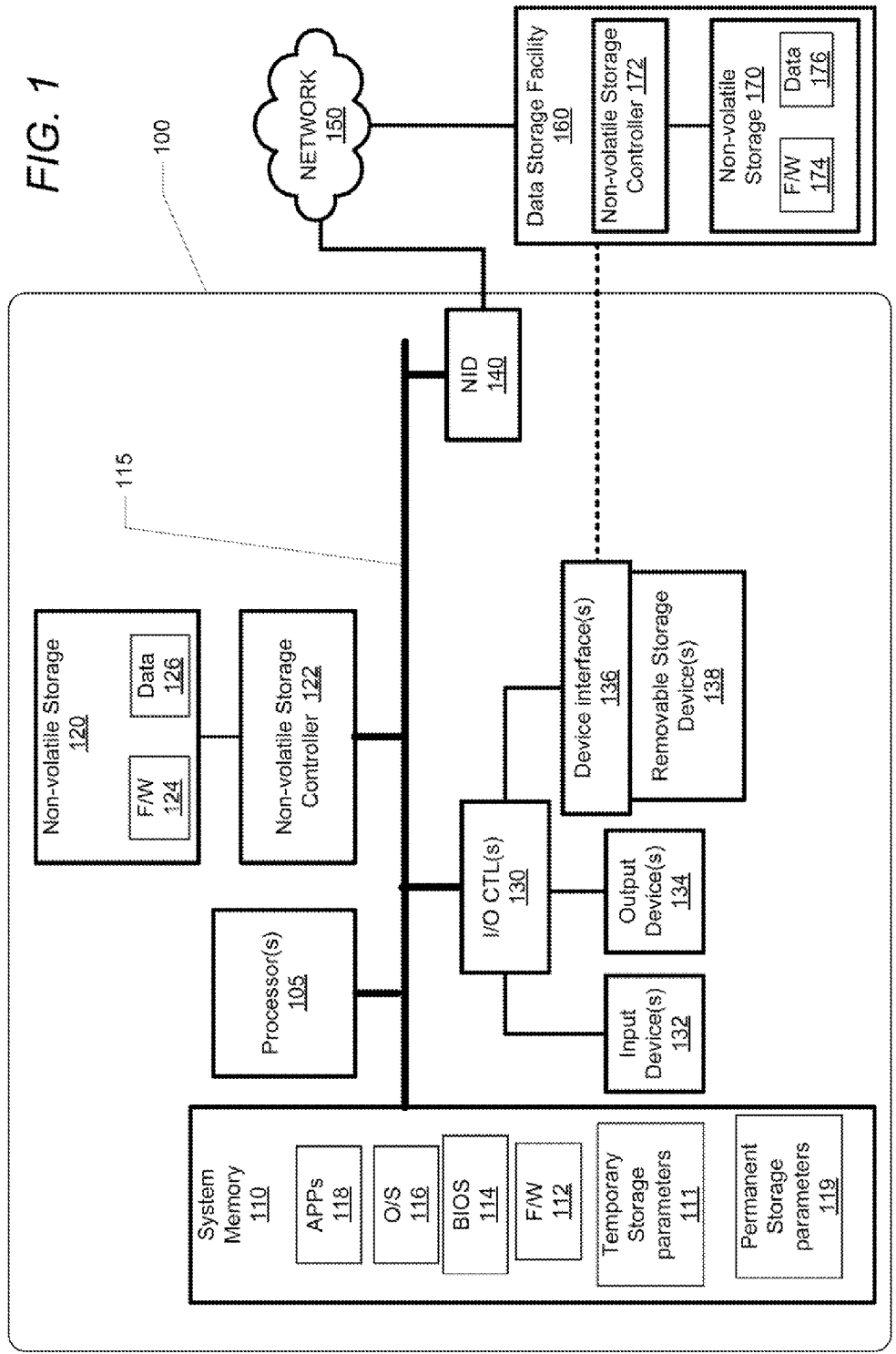
FIG. 1 illustrates an example information handling system within which various aspects of the disclosure can be implemented, according to one or more embodiments.

The illustrative embodiments provide an information handling system (IHS), a solid state storage system and a method performed within the information handling system that allows (1) a solid state non-volatile storage device to act as a cache for the temporary storage of temporary data, prior to storing the data as persistent data, and that allows (2) data to be initially written to the solid state non-volatile storage device as temporary data allowing for an increased number of errors during the write cycle. In one embodiment, the writing of the data as temporary data can be triggered in response to the occurrence of a fault condition such as a power failure.

Specifically, one or more embodiments provide a method that comprises: a storage device controller receiving a storage access operation to store data on the solid state storage system, wherein the solid state storage system comprises at least one non-volatile storage device having a plurality of individually accessible blocks, each of the blocks having a plurality of individually accessible pages; and in response to receiving the storage access operation to store data, initiating a first program cycle to initially store the data as temporary data within one or more of the blocks of the non-volatile storage device. The method further comprises: determining the number of errors that occur during the first program cycle; and in response to the number of errors being greater than a pre-established maximum number of errors for storage of data as temporary data, initiating another program cycle that stores the data as temporary data. This process is repeated until the error count is below the pre-established number of errors or the maximum number of allowed program cycles is reached. According to one aspect of the disclosure, the maximum number of errors allowed for temporary data storage is greater than the maximum number of errors allowed for permanent data storage. Both temporary data and permanent data are stored on the same non-volatile storage device. As an additional aspect of the disclosure, in response to a pre-established period of time for the temporary storage of temporary data being exceeded, the controller initiates a second program cycle to store the temporary data as persistent data within one or more of the accessible blocks. The second program cycle has an associated second set of parameters for storage of persistent data.

In the following detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

FIG. 1 illustrates a block diagram representation of an example information handling system (IHS) 100, within which one or more of the described features of the various embodiments of the disclosure can be implemented. For purposes of this disclosure, an information handling system, such as IHS 100, may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a handheld device, personal computer, a server, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring specifically to FIG. 1, example IHS 100 includes processor(s) 105 coupled to system memory 110 via system interconnect 115. System interconnect 115 can be interchangeably referred to as a system bus, in one or more embodiments. Also coupled to system interconnect 115 is a nonvolatile storage device controller (or storage controller) 122 coupled to nonvolatile storage 120 within which can be stored software and/or firmware 124 and one or more sets of data 126. As shown, system memory 110 can include therein a plurality of modules, including temporary data storage parameters 111, permanent data storage parameters 119, firmware (F/W) 112, basic input/output system (BIOS) 114, operating system (O/S) 116, and application(s) 118. The various software and/or firmware modules have varying functionality when their corresponding program code is executed by processor(s) 105 or other processing devices within IHS 100.

IHS 100 further includes one or more input/output (I/O) controllers 130 which support connection by and processing of signals from one or more connected input device(s) 132, such as a keyboard, mouse, touch screen, or microphone. I/O controllers 130 also support connection to and forwarding of output signals to one or more connected output devices 134, such as a monitor or display device or audio speaker(s). Additionally, in one or more embodiments, one or more device interfaces 136, such as an optical reader, a universal serial bus (USB), a card reader, Personal Computer Memory Card International Association (PCMIA) slot, and/or a high-definition multimedia interface (HDMI), can be associated with IHS 100. Device interface(s) 136 can be utilized to enable data to be read from or stored to corresponding removable storage device(s) 138, such as a compact disk (CD), digital video disk (DVD), flash drive, or flash memory card. In one or more embodiments, device interface(s) 136 can also provide an integration point for connecting other device(s) to IHS 100. In such implementation, device interfaces 136 can further include General Purpose I/O interfaces such as $I^2C$, SMBus, and peripheral component interconnect (PCI) buses.

IHS 100 comprises a network interface device (NID) 140. NID 140 enables IHS 100 to communicate and/or interface with other devices, services, and components that are located external to IHS 100. These devices, services, and components can interface with IHS 100 via an external network, such as example network 150, using one or more communication protocols.

Network 150 can be a local area network, wide area network, personal area network, storage area network, network attached storage, and the like, and the connection to and/or between network and IHS 100 can be wired or wireless or a combination thereof. For purposes of discussion, network 150 is indicated as a single collective component for simplicity. However, it is appreciated that network 150 can comprise one or more direct connections to other devices as well as a more complex set of interconnections as can exist within a wide area network, such as the Internet.

In the illustrative embodiment, network 150 also provides access to data storage facility 160, which can include a plurality of physical disks, solid state storage devices or other storage media. In one embodiment, data storage facility 160 is a redundant array of solid state storage media. Data storage facility 160 includes a storage controller 172 coupled to nonvolatile storage 170 within which can be stored software and/or firmware 174 and one or more pages and or blocks of data 176. In an alternate embodiment, and as represented by the second set of dashed interconnecting lines, data storage facility 160 can be directly connected to IHS 100 as an external storage device.

Figure 2:
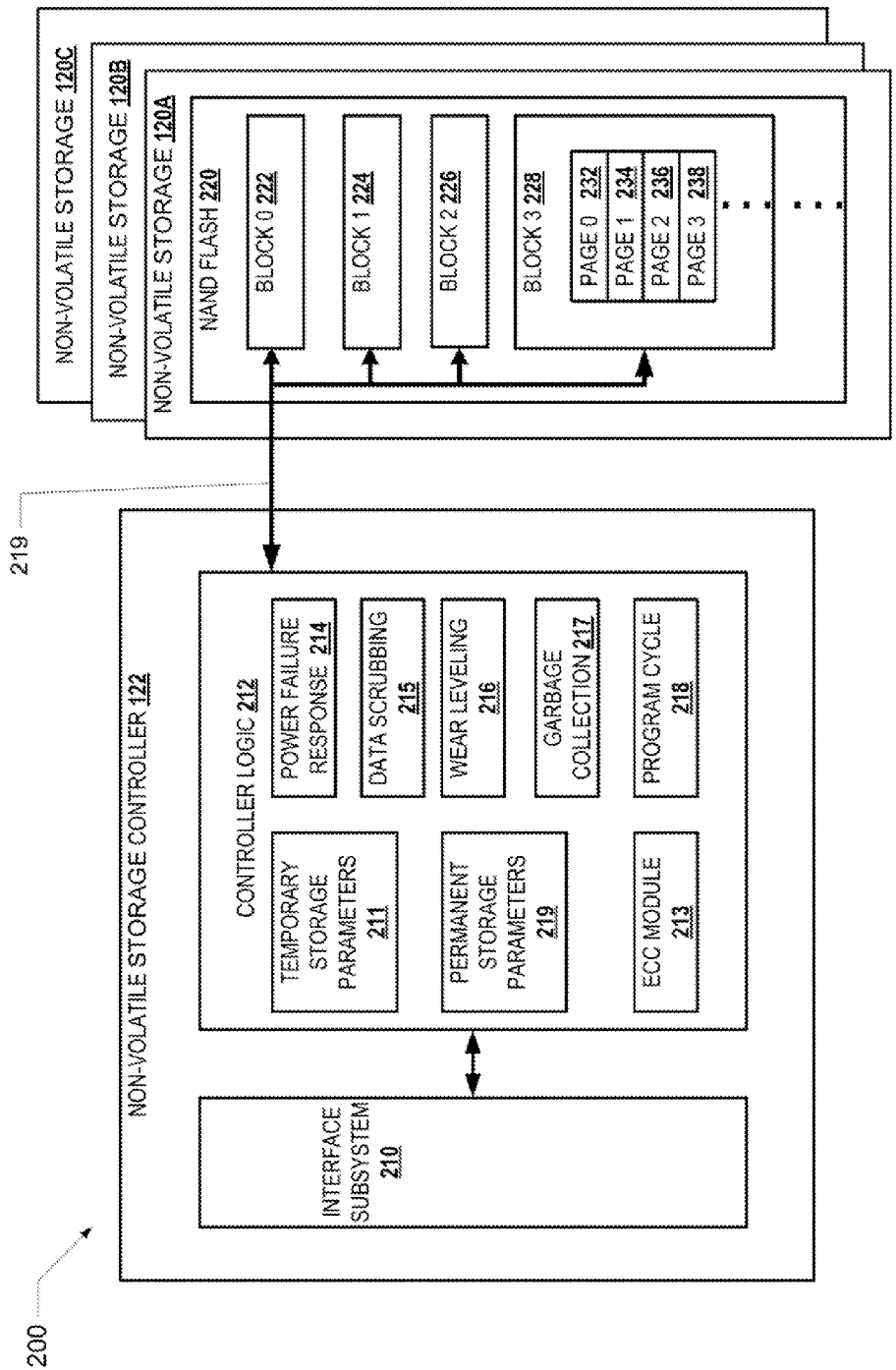
FIG. 2 illustrates a block diagram of an example memory system, in accordance with one or more embodiments.

With reference now to FIG. 2, there is illustrated one embodiment of storage subsystem 200 that can be utilized within IHS 100 and/or data storage facility 160 to store data and in particular to store both temporary data and permanent data. In the discussion of FIG. 2, reference is also made to elements described in FIG. 1. Storage subsystem 200 generally includes one or more nonvolatile storage 120A, 120B, and 120C and a storage controller 122 that controls and manages the flow of commands and data to and from storage 120A-C. Storage subsystem 200 can also represent nonvolatile storage 170 and storage controller 172 of data storage facility 160.

Nonvolatile storage 120A-C can each comprise NAND flash storage chips or NAND flash storage devices 220 that can be accessed by storage controller 122 via a storage access address and data bus 240. In other embodiments, NOR flash storage chips or other types of non-volatile memory storage chips or devices can be utilized. Each of the at least one NAND flash storage devices 220 contains a plurality of storage blocks. In the illustrative embodiment, the example organization of NAND flash storage devices 220 is illustrated having four individually accessible blocks, block 0 222, block 1 224, block 2 226 and block 3 228. The term "storage block" is used when referring to nonvolatile storage 120 that has NAND flash devices 220 connected to the same address and data buses (generally shown by the arrows extending from storage access bus 240). Since all storage blocks share the same storage access bus 240, only one block may utilize the data bus at any given time. The example organization of NAND flash storage devices 220 is illustrated with block 3 228 having four individually accessible pages, page 0 232, page 1 234, page 2 236 and page 3 238. While NAND flash storage device 220 is illustrated having four blocks with a block containing four pages, it is contemplated that NAND flash device 220 can be comprised of more or fewer blocks and pages as well as more or fewer busses. Software/firmware 124/174 and data 126/176 can be stored in and retrieved from pages 232-238 or other pages in the blocks of memory storage through the operation of read and write commands.

Nonvolatile storage controller 122 contains the logic necessary to read and write to NAND flash storage devices 220. Nonvolatile storage controller 122 comprises interface subsystem 210 and controller logic 212. Interface subsystem 210 manages communications between controller logic 212 and systems interconnect 115 or data storage facility 160. Controller logic 212 comprises temporary storage parameters 211, permanent storage parameters 219 and several functional modules, routines or processes including error correction code (ECC) module 213, power failure response 214, data scrubbing 215, wear leveling 216, garbage collection 217 and program cycle 218. Each of the nonvolatile storage controller components can communicate with each other via a communication fabric, which includes specific messaging signals communicated over specific signal lines (not illustrated). Functions, modules, routines, methods and processes of the present disclosure can be provided as firmware code and/or logic within nonvolatile storage controller 122. The firmware code and logic can include code segments or modules that can implement error correction code module (ECC) 213, power failure response 214, data scrubbing 215, wear leveling 216, garbage collection 217 and program cycle 218.

Temporary storage parameters 211 and permanent storage parameters 219 can be transmitted between system memory 110 and controller logic 212 in one embodiment. Temporary storage parameters 211 and permanent storage parameters 219 can be determined by processor 105 or other data sources and transmitted to controller logic 212 in another embodiment. Example temporary storage parameters 211 can include a time period such as a number of minutes, hours or days for the storage of temporary data, a pre-established number of errors permitted for temporary data storage and an indication of a specific memory operation to be performed in response to the pre-established number of errors permitted for temporary data storage being exceeded or the time period expiring. Example permanent storage parameters 219 can include, without limitation, a pre-established number of errors permitted for permanent data storage and an indication of a specific memory operation to be performed in response to the pre-established number of errors permitted for permanent data storage being exceeded. Program cycle 218 is a repetitive process for storing individual pages of data to memory pages such as pages 232-238. Each program cycle includes several mini-cycles. Each mini-cycle consists of a write, followed by a read-verify. Error correction code (ECC) module 213 tracks the number of errors that occur during the program cycle and controls the correction of corrupted pages of data. Power failure response 214 detects power failures and manages the immediate writing to the storage device of temporary or permanent data in the event of a loss of power to prevent loss of data. Data scrubbing 215 manages the rebuilding of data if the number of errors within the stored data exceeds a corresponding pre-determined limit for that data and also manages the rewriting of temporary data as permanent data. Because individual memory cells within NAND flash devices 220 have a maximum number of write cycles, wear leveling 216 is used to evenly distribute the write cycles across the individual blocks and pages. NAND flash devices 220 require at least one empty block in order to write data. Garbage collection 217 determines pages with invalid data and selects blocks to be erased such that there is a supply of empty blocks for future writes.

According to one embodiment, when data is received by storage controller 122 from IHS 100, controller logic 212 initiates a first program cycle, program cycle 218, to write the data as temporary data within one or more empty blocks from blocks 222-228 of NAND flash storage device 220. Controller logic 212 performs program cycles to store the data to NAND flash storage device 220. A program cycle comprises multiple mini-cycles. Each mini-cycle consists of a write, followed by a read-verify. If the read verify is not successful, then a successive program mini-cycle occurs at a higher voltage. The mini-cycles continue until the read-verify is deemed successful.

According to another embodiment, when data is received by storage controller 122 from IHS 100, controller logic 212 determines if the storage parameters 211 associated with the write request include temporary parameter values triggering temporary storage of the data. In one embodiment, the default storage of data received is permanent storage of the data. If the storage access operation is a write request to provide temporary storage of data, storage controller 122 (via execution of code corresponding to program cycle 218), initiates a first program cycle to write the data as temporary data within one or more empty blocks from blocks 222-228 of NAND flash storage device 220. Controller logic 212 performs program cycles to store the data to NAND flash storage device 220. A program cycle comprises multiple mini-cycles. Each mini-cycle consists of a write, followed by a read-verify. If the read verify is not successful, then a successive program mini-cycle occurs at a higher voltage. The mini-cycles continue until the read-verify is deemed successful. According to one aspect of the disclosure, the NAND flash storage devices 220 provide both permanent data storage and temporary data storage based on the type of write request received by controller logic 212 to store the data.

Those of ordinary skill in the art will appreciate that the hardware components and basic configuration depicted in FIGS. 1 and 2 and described herein may vary. For example, the illustrative components within IHS 100 (FIG. 1) are not intended to be exhaustive, but rather are representative to highlight components that can be utilized to implement aspects of the present disclosure. For example, other devices/components may be used in addition to or in place of the hardware depicted. The depicted examples do not convey or imply any architectural or other limitations with respect to the presently described embodiments and/or the general disclosure.

Figure 3:
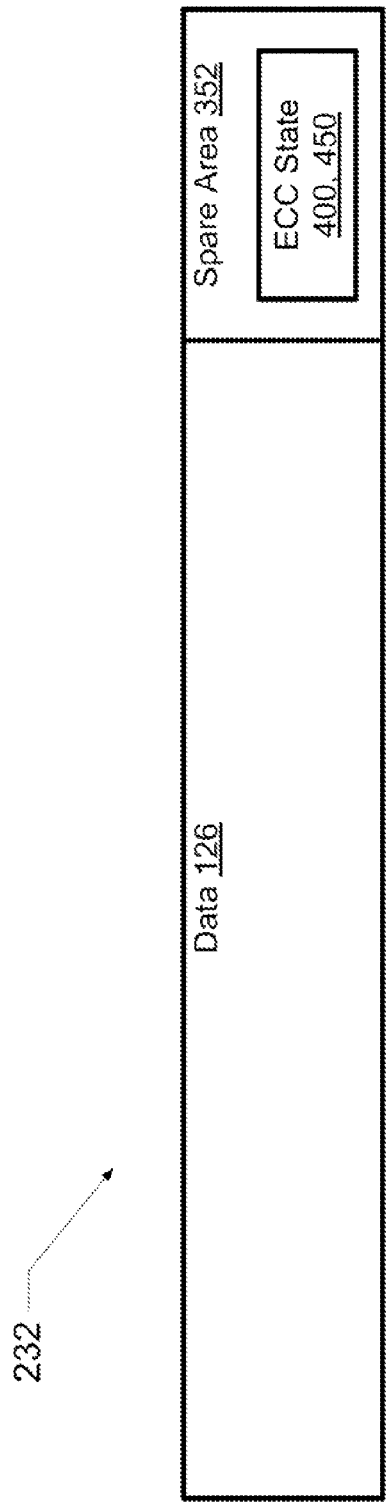
FIG. 3 illustrates a memory page, in accordance with one or more embodiments.

FIG. 3 illustrates further details of the memory pages, for example memory page 0 232. Memory page 0 232 comprises a number of bytes or bits dedicated to the storage of data 126 and a spare area 352 that contains bytes dedicated to ECC. In an example embodiment, memory page 0 232 can contain 4096 bytes for data 126 and 128 bytes for spare area 352. Spare area 352 can contain ECC state table or ECC state ranges 400, 450 that contains parameters associated with error correction code and parameters associated with a loss of power to NAND flash memory chip 220 (FIG. 2).

Figure 4A:
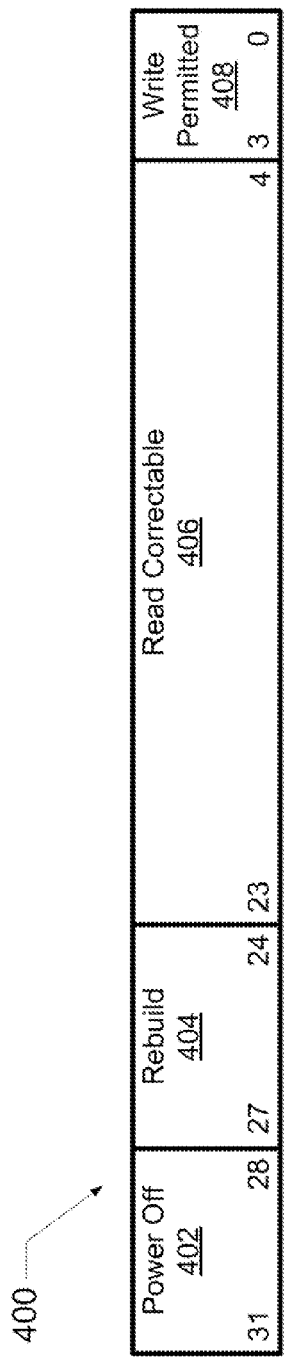
FIG. 4A illustrates an example of error correcting code (ECC) state ranges for storage of permanent data, in accordance with one or more embodiments.

FIG. 4A illustrates an example of error correcting code (ECC) state ranges 400 for the storage of permanent data. In the discussion of FIG. 4A, reference is also made to elements described in FIG. 1, FIG. 2 and FIG. 3. ECC state ranges 400 are tracked and set by ECC module 213 within controller logic 212. In one embodiment, ECC state ranges 400 include 32 bits. ECC state ranges 400 comprise power off bits 402, rebuild bits 404, read correctable bits 406 and write permitted bits 408. Power off bits 402 include bits 28-31 and are used when power is no longer supplied to NAND flash memory device 220 to protect against data corruption when the device is powered off or loses power.

Write permitted bits 408 include bits 0-3 and are used to count and track the number of errors that are detected during a program cycle to store data. After a pre-determined maximum number of errors has been reached during the program cycle, no new writes to the memory page are required. Read correctable bits 406 include bits 4-23 and are used to count and track the number of errors that are detected during error correction of corrupt data for each read operation. In FIG. 4A, read correctable bits 406 are the largest number or range of bits and are used during read operations. Rebuild bits 404 include bits 24-27 and are used to indicate that a pre-determined total maximum number of errors during read correction have been exceeded and that data 126 is to be rebuilt. When the pre-determined number of ECC errors during a read operation has been exceeded, the data must be read, error corrected and written to a new page or block to keep the range of errors within a correctable range.

Figure 4B:
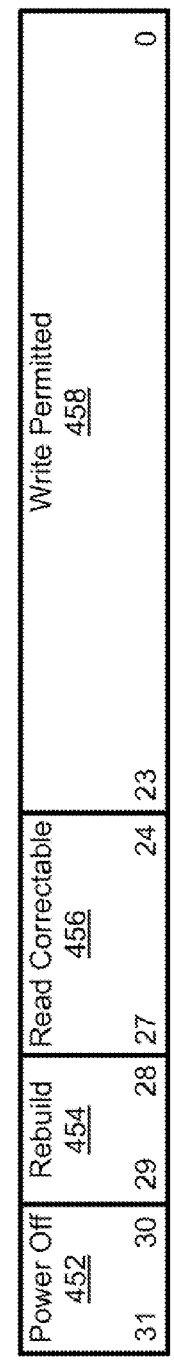
FIG. 4B illustrates an example of error correcting code (ECC) state ranges for storage of temporary data, in accordance with one or more embodiments.

FIG. 4B illustrates an example of error correcting code (ECC) state ranges 450 for the storage of temporary data. In the discussion of FIG. 4B, reference is also made to elements described in FIG. 1, FIG. 2 and FIG. 3. ECC state ranges 450 are tracked and set by ECC module 213 within controller logic 212. In one embodiment, ECC state ranges 450 include 32 bits. ECC state ranges 450 comprise power off bits 452, rebuild bits 454, read correctable bits 456 and write permitted bits 458. Power off bits 452 include bits 30-31 and are used when power is no longer supplied to NAND flash storage device 220 to protect against data corruption when the device is powered off or loses power.

Write permitted bits 458 include bits 0-23 and are used to count and track the number of errors that are detected during a program cycle to store data. After a pre-determined maximum number of errors has been reached during the program cycle, no new writes to the memory page are required. Read correctable bits 456 include bits 24-27 and are used to count and track the number of errors that are detected during error correction of corrupt data for each read operation. In FIG. 4B, write permitted bits 458 are the largest number or range of bits and are used during write operations of the program cycle. Rebuild bits 454 include bits 28-29 and are used to indicate that a pre-determined total maximum number of errors during read correction have been exceeded and that data 126 is to be rebuilt. When the pre-determined number of ECC errors during a read operation has been exceeded, the data must be read, error corrected and written to a new page or block to keep the range of errors within a correctable range.

Referring to FIG. 5, an array of storage blocks 500 contained within one embodiment of NAND flash device 220 is shown. Array of storage blocks 500 comprises stale blocks 502, partial blocks 504, valid blocks 506, temporary/cache blocks 508 and erased blocks 510. Stale blocks 502 contain a sufficient level of pages of stale data to be candidates for the garbage collection process. Partial blocks 504 contain some pages of stale data, but not enough pages of stale data to be designated as a stale block. Valid blocks 506 contain all pages with valid permanent data. Temporary/cache blocks 508 contain pages that act as a cache, holding pages of data for a short time until the pages of data can be permanently stored or are no longer required. Data stored within temporary/cache blocks 508 are referred to herein as temporary data while data stored in valid blocks 506 and other non-temporary blocks are referred to as permanent data. Erased blocks 510 are empty and are ready to have data written to them.

FIG. 6-FIG. 10 illustrate flowcharts of exemplary methods by which IHS 100 and nonvolatile storage controller 122 presented within the preceding figures, perform different aspects of the processes that enable the one or more embodiments of the disclosure. Generally, method 600, method 700, method 800, method 900 and method 1000 collectively represent memory/storage controller implemented methods to store some types of data to a solid state storage device as temporary data using temporary data parameters. The description of each method is provided with general reference to the specific components illustrated within the preceding figures. Generally each method is described as being implemented via controller logic 212 and particularly the execution of code provided by software/firmware 124/174 acting within modules 213, 214, 216, 215, 217 and 218. It is however appreciated that certain aspects of the described methods may be implemented via other processing devices and/or execution of other code. In the discussion of FIG. 6-FIG. 10, reference is also made to elements described in FIG. 1-FIG. 5.

Figure 6:
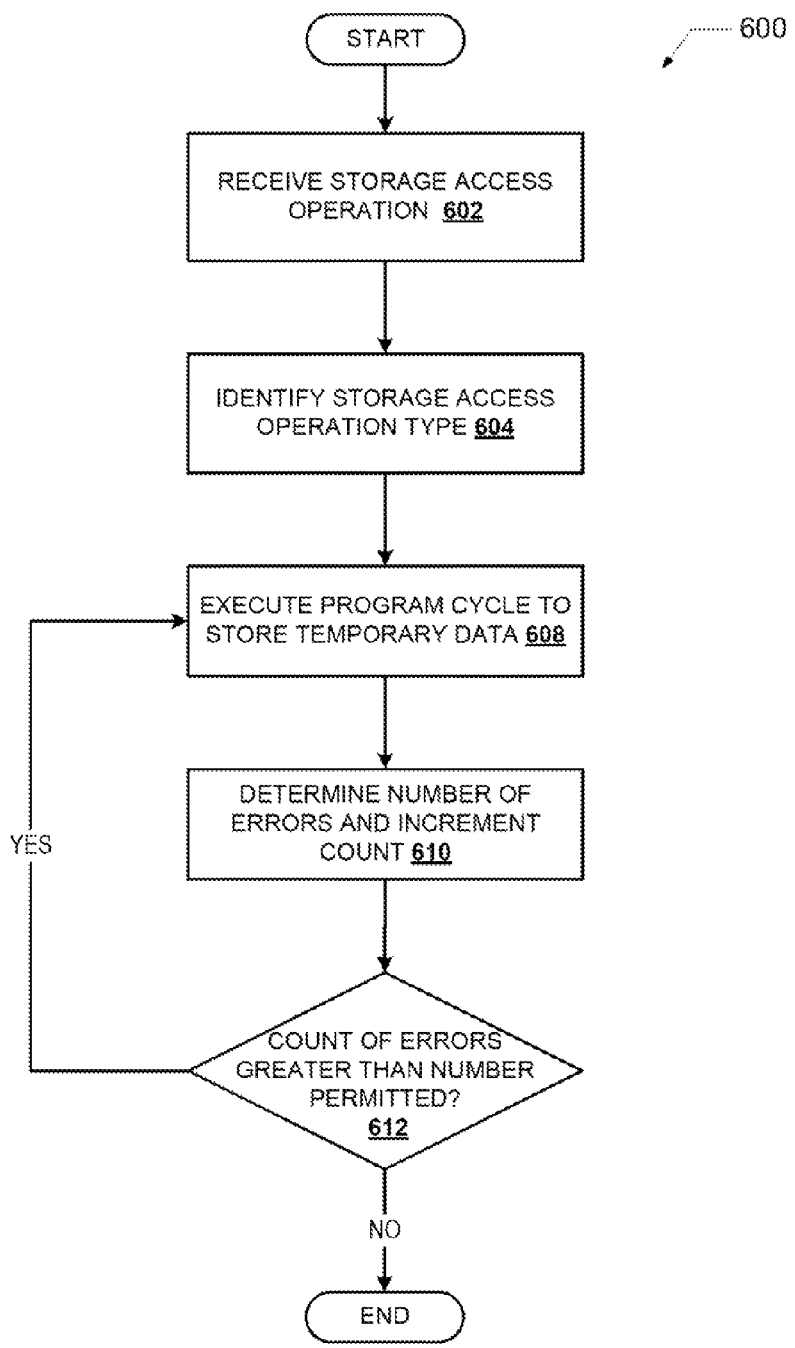
FIG. 6 is a flow chart illustrating one example of the method by which data is stored as temporary data, according to one or more embodiments.

FIG. 6 illustrates an example method by which data is selectively stored to the nonvolatile storage device 120A-C as temporary data. Method 600 begins at the start block and proceeds to block 602 at which controller logic 212 receives a storage access operation such as a data write operation from processor 105. Controller logic 212 identifies the storage access operation type (block 604). The storage access operation type can include storing data as temporary data to nonvolatile storage 120. Controller logic 212 triggers program cycle module 218 to execute a program cycle to store the data to a memory page as temporary data at block 608. The program cycle includes one or more writes to the memory page followed by a read verify. During execution of the program cycle, ECC module 213 tracks and counts the number of errors that occur during writing of the page of temporary data (block 610). When errors are detected during the writing of a page of temporary data, ECC module 213 sets one or more bits in write permitted state range 458.

Program cycle module 218 determines at block 612 whether the count of the number of errors during writing of temporary data is greater than a pre-established number of errors permitted during writing of temporary data. In the present illustrative embodiment, the number of errors corresponds to bits 0-23 in write permitted state range 458. In response to the number of errors not being greater than the pre-established number of errors permitted for the storage of temporary data, method 600 ends. In response to the number of errors being greater than the pre-established number of errors permitted for the storage of temporary data, program cycle module 218 returns to block 608 to initiate and execute another program cycle.

Figure 7:
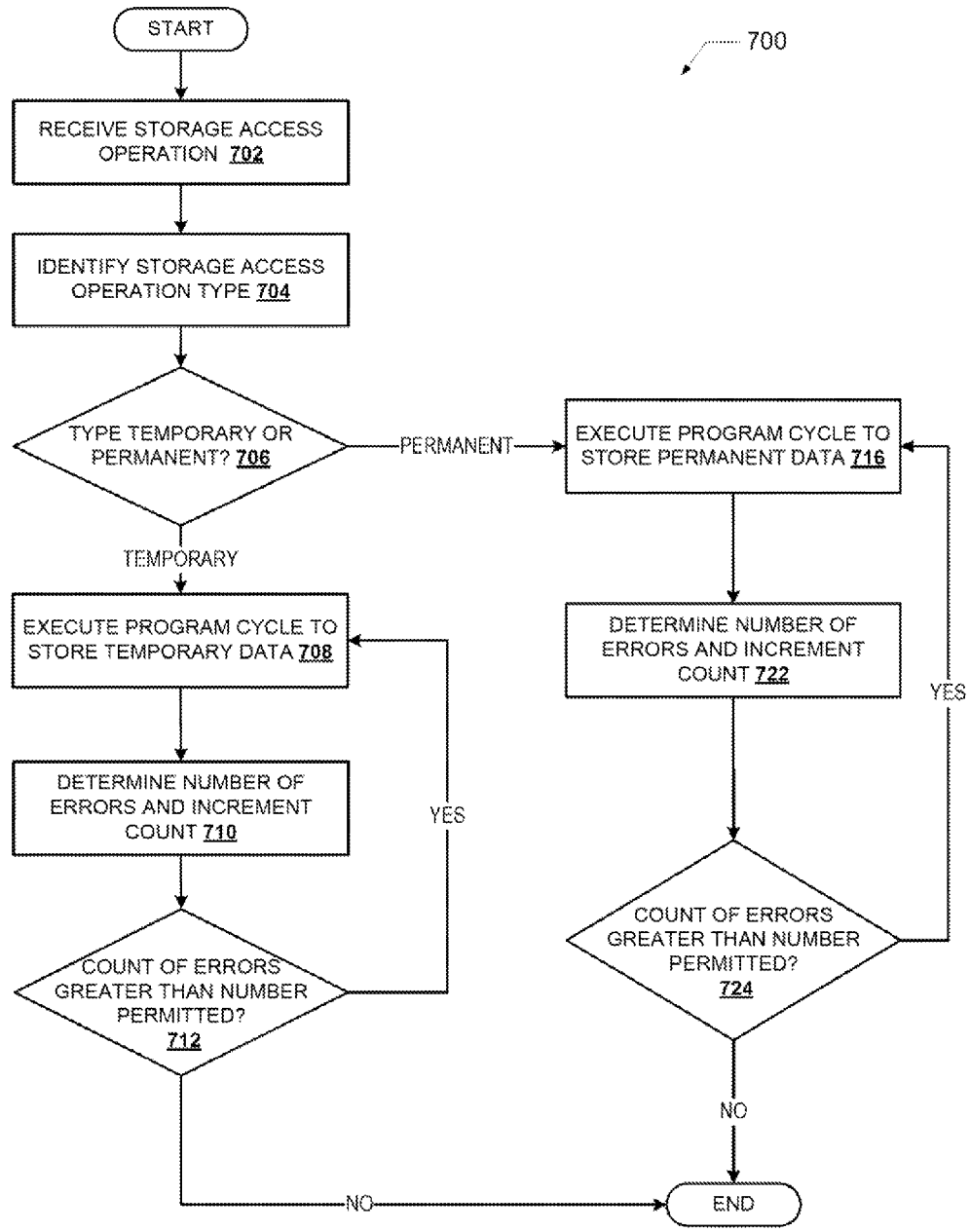
FIG. 7 is a flow chart illustrating one example of the method by which data is stored as temporary data or permanent data, according to one or more embodiments.

FIG. 7 illustrates an alternative embodiment of an example method by which data is selectively stored to the nonvolatile storage device 120 as temporary data or permanent data. Method 700 begins at the start block and proceeds to block 702 at which controller logic 212 receives a storage access operation such as a data write operation from processor 105. Controller logic 212 identifies the storage access operation type (block 704). The storage access operation type can include storing data as temporary data or storing data as permanent data to nonvolatile storage 120. Controller logic 212 determines at block 706 whether the storage access operation type is temporary write or a permanent write.

In response to the storage access operation type being a store of temporary data, controller logic 212 triggers program cycle module 218 to execute a program cycle to store the data to a memory page as temporary data at block 708. In response to the storage access operation type being a store of permanent data, program cycle module 218 executes a program cycle to store the data to a memory page as permanent data at block 716.

Program cycle module 218 can use temporary parameters 211 and permanent storage parameters 219 during the program cycle. The program cycle includes one or more writes to the memory page followed by a read verify. During execution of the program cycle, ECC module 213, tracks and counts the number of errors that occur during writing of the page of temporary data (block 710). When errors are detected during the writing of a page of temporary data, ECC module 213 sets one or more bits in write permitted state range 458. Program cycle module 218 determines at block 712 whether the count of the number of errors during writing of temporary data is greater than a pre-established number of errors permitted during writing of temporary data. The number of errors corresponds to bits 0-23 in write permitted state range 458. In response to the number of errors being less than the pre-established number of errors permitted for the storage of temporary data, method 700 ends. In response to the number of errors being greater than the pre-established number of errors permitted for the storage of temporary data, method 700 returns to block 708 to execute another program cycle.

After storing permanent data in block 716, ECC module 213 tracks and counts the number of errors that occur during writing of the page of permanent data (block 722). As utilized herein permanent data refers to and is synonymous with persistent data, and the two terms are utilized interchangeably. When errors are detected during the writing of a page of permanent data, ECC module 213 sets one or more bits in write permitted state range 408. Program cycle module 218 determines at block 724 whether the count of the number of errors during writing of permanent data is greater than a pre-established number of errors permitted during writing of permanent data. The number of errors corresponds to bits 0-3 in write permitted state range 408. In response to the number of errors being less than the pre-established number of errors permitted for the storage of permanent data, method 700 ends. In response to the number of errors being greater than the pre-established number of errors permitted for the storage of permanent data, method 700 returns to block 716 to execute another program cycle.

Figure 8:
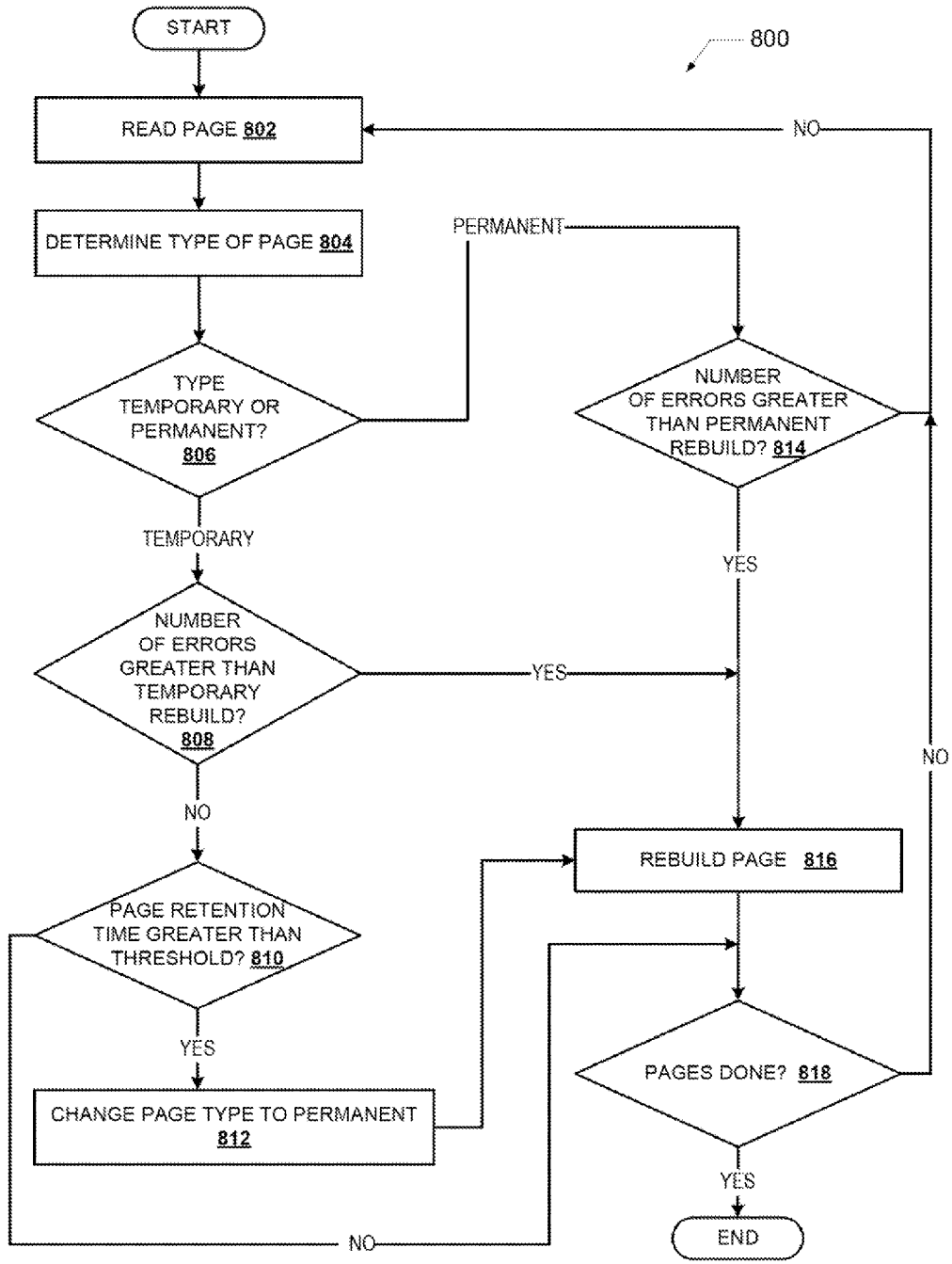
FIG. 8 is a flow chart illustrating one example of a data scrubbing method, according to one or more embodiments.

With reference to FIG. 8, a flow chart illustrating one embodiment of a data scrubbing method is shown. Method 800 begins at the start block and proceeds to block 802 where data scrubbing module 215 reads a page of data from NAND flash storage device 220. Data scrubbing module 215 determines the type of data stored on the page (block 804). Data scrubbing module 215 determines at block 806 if the data is temporary data or permanent data. In response to the data being temporary data, data scrubbing module 215 determines at block 808 if the number of errors for the page is greater than a pre-established maximum number of errors permitted for temporary data that would trigger a rebuild of the temporary data. In response to the number of errors for the page being greater than the pre-established maximum number of errors permitted, data scrubbing module 215 rebuilds the page of temporary data and rewrites the page of temporary data (block 816). Method 800 then proceeds to block 818).

In response to the number of errors for the page being less than the pre-established temporary data rebuild number of errors permitted, data scrubbing module 215 determines at block 810 if the length of time since the temporary data was initially stored is greater than a pre-established threshold maximum time period for temporary storage of the data. In response to the page retention time being greater than the pre-established threshold maximum time period, data scrubbing module 215 changes the page type from temporary to permanent (block 812) and rebuilds the page of data, and rewrites the data as permanent data (block 816). Method 800 then proceeds to block 818. In response to the page retention time being less than the pre-established threshold maximum time period for temporary storage of the data, data scrubbing module 215 determines, at block 818, if the all of the pages targeted for the data scrubbing operation are completed or done. In response to the pages targeted for data scrubbing being done, method 800 ends. In response to there being pages targeted for data scrubbing remaining, method 800 returns to block 802 where data scrubbing module 215 reads the next page of data from NAND flash storage device 220.

In response to the determination from block 806 of the data being permanent data, data scrubbing module 215 determines at block 814 if the number of errors for the page is greater than a pre-established maximum number of errors permitted for permanent data. In response to the number of errors for the page being less than the pre-established maximum number of errors permitted for permanent data, method 800 returns to block 802 where data scrubbing module 215 reads the next page of data from NAND flash storage device 220. In response to the number of errors for the page being greater than the pre-established maximum number of errors permitted for permanent data, data scrubbing module 215, rebuilds the page of data and rewrites the data as permanent data (block 816). Data scrubbing module 215 determines at block (block 818), if the all of the pages targeted for the data scrubbing operation are completed or done. In response to the pages targeted for data scrubbing being done, method 800 ends. In response to there being pages targeted for data scrubbing remaining, method 800 returns to block 802 where data scrubbing module 215 reads the next page of data from NAND flash storage device 220.

Figure 9:
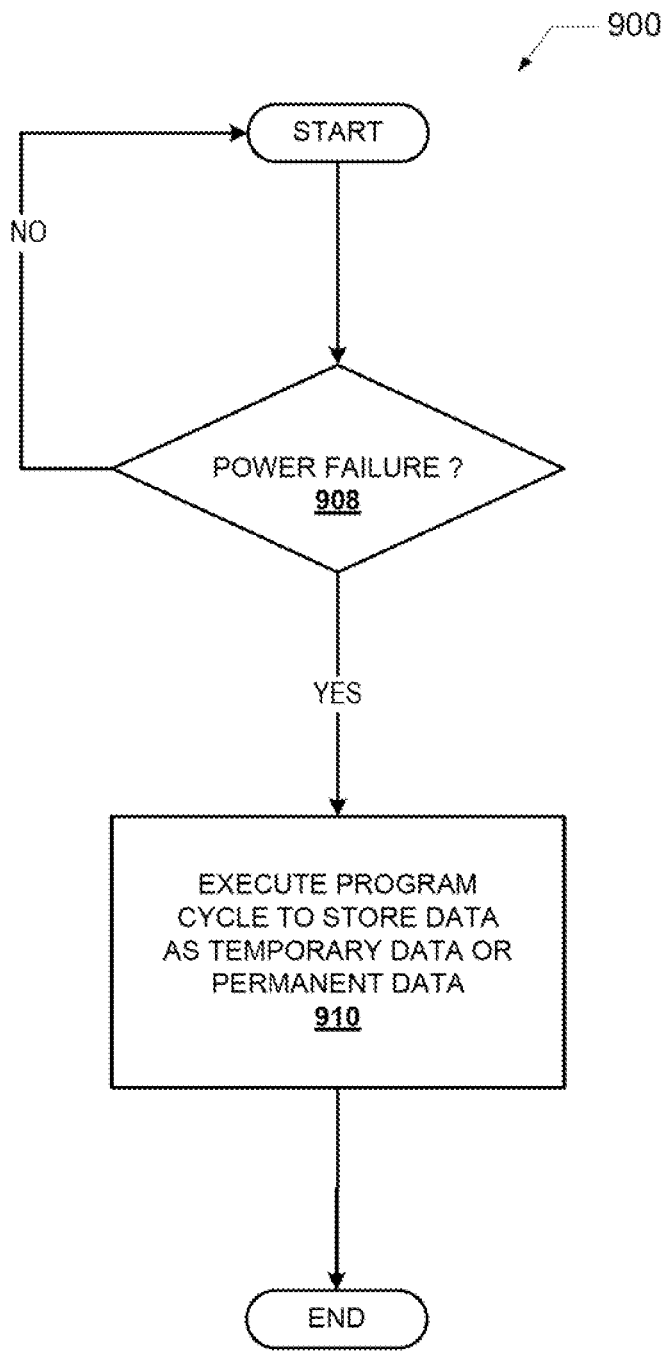
FIG. 9 is a flow chart illustrating one example of a method of storing data after the occurrence of a power failure, according to one or more embodiments.

Turning to FIG. 9, a flow chart is shown illustrating a method of storing data to prevent loss of data during a power failure. Method 900 begins at the start block and proceeds to block 908 where a power failure response routine 214 within storage controller logic 212 determines if a power failure or loss of main power to controller logic 212 and/or nonvolatile storage 120A-C has occurred. Method 900 returns to the start block when no power failure has occurred. In response to a power failure, power failure response routine 214, executes a program cycle to store pending or non-stored permanent data as temporary data or permanent data to an available block of the storage device 120A-C (block 910). Power failure response routine 214 allows for an increased number of write permitted errors 458 (FIG. 4B) and a lower number of write cycles to complete the storage of temporary data. Method 900 then ends.

Figure 10:
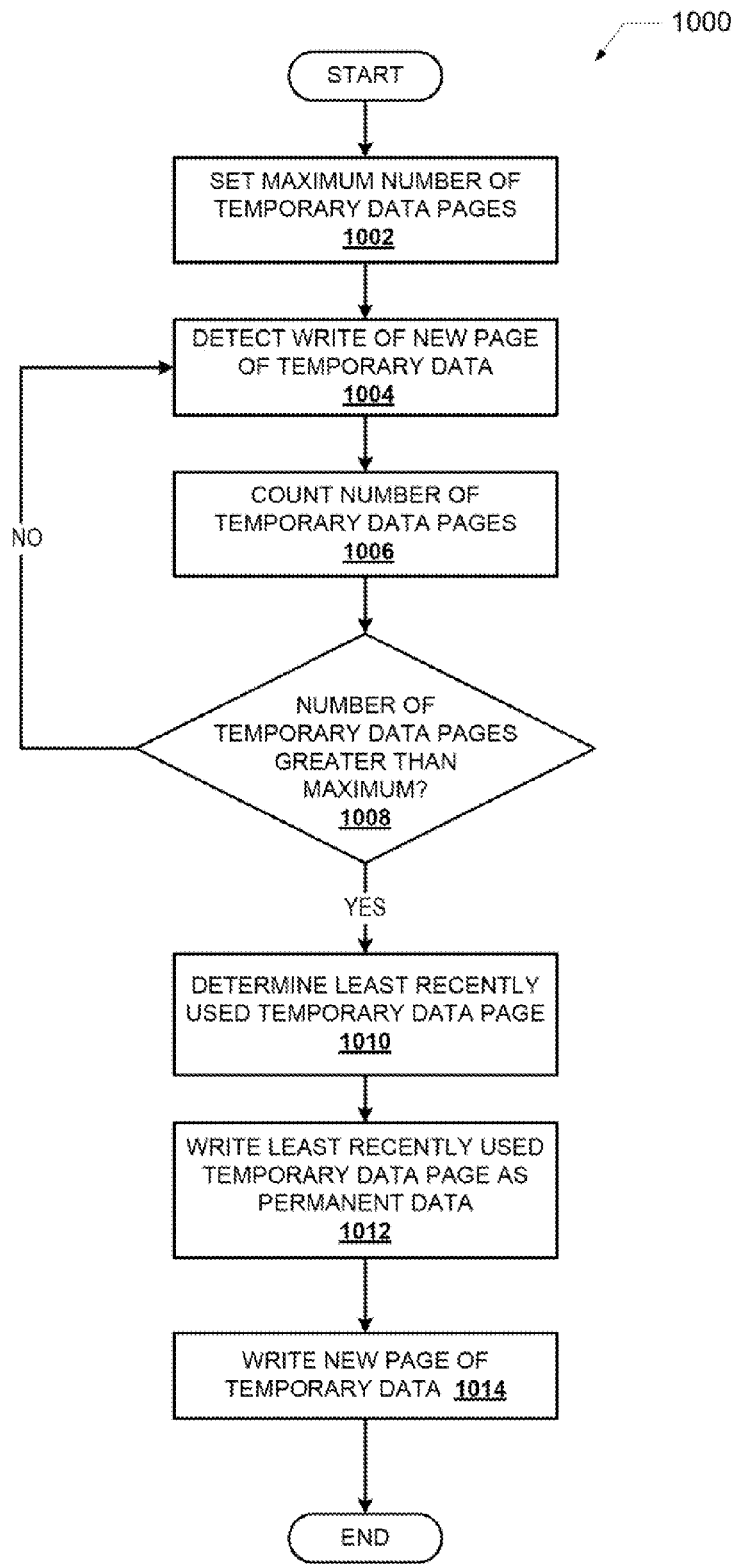
FIG. 10 is a flow chart illustrating one example of a method of determining which temporary data to replace within the nonvolatile storage device, according to one or more embodiments.

FIG. 10 illustrates a flow chart of a method of determining least recently used temporary data when a limit/cap is pre-established on the amounts of blocks of storage that can be allocated to provide temporary storage within the storage device. Method 1000 begins at the start block and proceeds to block 1002 where controller logic 212 sets a maximum number of pages for temporary data within NAND flash storage device 220. Controller logic 212 detects a request to write a new page of temporary data (block 1004). Controller logic 212 counts the number of pages of temporary data within NAND flash storage device 220 (block 1006). In an alternative embodiment, controller logic 212 can track the actual number of temporary data pages with a counter that is automatically incremented for each new temporary page and decremented for each temporary page that is moved to permanent storage or is determined to be stale. Controller logic 212 determines at block 1008 if the number of pages of temporary data is greater than a pre-determined maximum number of pages allocated for temporary data storage. In response to the number of pages of temporary data being less than a pre-determined maximum number of pages allocated for temporary data storage, method 1000 returns to block 1004. In response to the number of pages of temporary data being greater than a pre-determined maximum number of pages allocated for temporary data storage, controller logic 212 determines which page of temporary data is a least recently used page of temporary data (1010) and writes the least recently used page of temporary data as permanent data (1012), before writing the new page of temporary data (1014). The new page of temporary data is thus written in response to completion of the storage of the least recently used page of temporary data as permanent data. Method 1000 then terminates at the end block.

In the above described flow chart, one or more of the methods may be embodied in a computer readable medium containing computer readable code such that a series of functional processes are performed when the computer readable code is executed on a computing device. In some implementations, certain steps of the methods are combined, performed simultaneously or in a different order, or perhaps omitted, without deviating from the scope of the disclosure. Thus, while the method blocks are described and illustrated in a particular sequence, use of a specific sequence of functional processes represented by the blocks is not meant to imply any limitations on the disclosure. Changes may be made with regards to the sequence of processes without departing from the scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object oriented programming language, without limitation. These computer program instructions may be provided to a processor of a general purpose computer, special purpose computer, such as a service processor, or other programmable data processing apparatus to produce a machine, such that the instructions, which execute via the processor of the computer or other programmable data processing apparatus, performs the method for implementing the functions/acts specified in the flowchart and/or block diagram block or blocks.

As will be further appreciated, the processes in embodiments of the present disclosure may be implemented using any combination of software, firmware or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A method of operating a solid state storage system, the method comprising:
    a storage device controller receiving a storage access operation to store data on the solid state storage system, wherein the solid state storage system comprises at least one non-volatile storage device having a plurality of individually accessible blocks;
    in response to receiving the storage access operation to store data on the solid state storage system, initiating a first program cycle to temporarily store the data as temporary data within one or more of the blocks of the non-volatile storage device, wherein the program cycle has an associated first set of parameters for enabling initial storage of the data as temporary data; and
    wherein the first program cycle further comprises:
        determining a number of errors that occurs during execution of the first program cycle;
        incrementing a first count of the number of errors that occurred during execution of the first program cycle;
        comparing the first count to a pre-established first number of errors permitted for storage of temporary data; and
        responsive to the first count being greater than the pre-established first number of errors permitted for storage of temporary data, repeating the first program cycle.

2. The method of claim 1, further comprising:
    determining if a pre-established period of time for initial storage of the data as temporary data has been exceeded; and
    in response to the pre-established period of time being exceeded, initiating a second program cycle to store the temporary data as persistent data within one or more of the blocks of the non-volatile storage device, wherein the second program cycle has an associated second set of parameters for storage of persistent data.

3. The method of claim 1, wherein the pre-established first number of errors permitted for storage of temporary data is greater than a pre-established second number of errors allowed for storage of persistent data.

4. The method of claim 1, further comprising:
    receiving at the storage controller a plurality of temporary data parameters associated with at least a portion of the data, wherein the temporary data parameters comprise at least one of a first time period for temporary storage, a pre-established first number of errors permitted for temporary storage, and a selected storage operation from among multiple operations that can be performed in response to the controller determining that the pre-established first number of errors permitted for temporary storage of the portion of data has been exceeded;
    wherein the temporary data parameters allow the storage controller to reduce a number of write cycles to temporarily store the portion of data, relative to the number of write cycles required for a permanent storage of data, and wherein the storage controller utilizes at least one page of the non-volatile storage device as a cache storage.

5. The method of claim 1, further comprising:
    responsive to detecting a power failure in the solid state storage system, executing one or more first program cycles to store all pending data to the storage device as temporary data.

6. A method of operating a solid state storage system, the method comprising:
    a storage device controller receiving a storage access operation to store data on the solid state storage system, wherein the solid state storage system comprises at least one non-volatile storage device having a plurality of individually accessible blocks;
    in response to receiving the storage access operation to store data on the solid state storage system, initiating a first program cycle to temporarily store the data as temporary data within one or more of the blocks of the non-volatile storage device, wherein the program cycle has an associated first set of parameters for enabling initial storage of the data as temporary data;
    setting a maximum number of pages for use in storing temporary data within the storage device; and
    in response to receiving a write request to write a new page of temporary data:
        counting a number of pages of temporary data within the storage device; and
        in response to the number of pages of temporary data being greater than the maximum number of pages allowed for temporary data storage: determining a least recently used page of temporary data; writing the least recently used page of temporary data as permanent data; and writing the new page of temporary data in response to completion of the writing of the least recent used page of temporary data as permanent data.

7. A solid state storage system comprising:
    at least one non-volatile storage device having a plurality of individually accessible blocks, each of the blocks having a plurality of individually accessible pages;
    a storage controller coupled to the non-volatile storage device for controlling storage access operations, the storage controller receiving a storage access operation to store data on the solid state storage system wherein the storage controller comprises logic that:
        identifies whether the storage access operation is a first-type write request for providing temporary storage of the data;
        in response to the storage access operation being the first-type write request, initiating a first program cycle to store the data as temporary data within one or more of the blocks of the non-volatile storage device, wherein the first program cycle has an associated first set of parameters for temporary storage that are different from a second set of parameters for permanent storage within the non-volatile storage device, and wherein the non-volatile storage device provides both permanent data storage and temporary data storage based on a type of write request received to store the data;

in response to successful completion of the first program cycle, executes error correction code (ECC) to count a first number of errors that occurred during execution of the first program cycle; and compares the first number of errors to a pre-established first number of errors permitted for temporary storage, wherein the pre-established first number of errors permitted for temporary data storage on the non-volatile storage device is greater than a pre-established second number of errors allowed for permanent storage.

8. The solid state storage system of claim 7, wherein the storage controller further comprises logic that:

performs a data scrubbing operation on the storage device, the data scrubbing operation comprising:

determining if data stored within each page is temporary data or permanent data; and responsive to the data being permanent data:

comparing a third number of errors for the permanent data to a pre-established third number of errors permitted for permanent storage;

responsive to the third number of errors being less than the pre-established third number of errors permitted for permanent storage, continuing the data scrubbing operation for additional data; and responsive to the third number of errors being greater than the pre-established third number of errors permitted for permanent storage, rebuilding the permanent data.

9. The solid state storage system of claim 8, wherein the storage controller further comprises logic that:

responsive to the data being temporary data:

compares a fourth number of errors to a pre-established fourth number of errors permitted for temporary storage;

responsive to the fourth number of errors being greater than the pre-established fourth number of errors permitted for temporary storage, rebuilds the temporary data; and responsive to the fourth number of errors being less than the pre-established fourth number of errors permitted for temporary storage, continues the data scrubbing operation for additional data.

10. The solid state storage system of claim 7, wherein the storage controller further comprises logic that:

determines a data retention time for one or more pages of temporary data; and responsive to the data retention time being greater than a first time period, rewrites the temporary data as permanent data.

11. The solid state storage system of claim 7, wherein the storage controller further comprises logic that:

receives at the storage controller a plurality of temporary data parameters associated with at least a portion of the data, wherein the temporary data parameters comprise at least one of a first time period for temporary storage, the pre-established first number of errors permitted for temporary storage, and a selected storage operation of multiple operations that can be performed in response to the controller determining that the pre-established first number of errors permitted for temporary storage of the portion of data has been exceeded, wherein the temporary data parameters allow the storage controller to reduce a number of write cycles to store the portion of data, relative to the number of write cycles required for a permanent storage of data, and wherein the storage controller utilizes at least one page of the non-volatile storage device as a cache storage.

12. The solid state storage system of claim 7, wherein the storage controller further comprises logic that:

performs a plurality of timed periodic first program cycles to store data as temporary data in order to prevent loss of data during the occurrence of a power failure in the solid state storage system; and responsive to detecting the power failure in the solid state storage system, executes the first program cycle to store all pending data to the storage device as temporary data.

13. The solid state storage system of claim 7, wherein the storage controller further comprises logic that:

sets a maximum number of pages for temporary data within the storage device; and in response to receiving a write request to write a new page of temporary data:

counts a number of pages of temporary data within the storage device; and responsive to the number of pages of temporary data being greater than the maximum number of pages of temporary data: determines a least recently used page of temporary data and writes the least recently used page of temporary data as permanent data before writing the new page of temporary data.

14. An information handling system (IHS) comprising:

one or more processors;

a storage system coupled to the processor and in communication with the processor, the storage system comprising: at least one non-volatile storage device having a plurality of individually accessible blocks, each of the blocks having a plurality of individually accessible pages; and a storage controller coupled to the non-volatile storage device, the storage controller having firmware executing thereon to provide control of storage system operations wherein the firmware configures the storage controller to:

identify whether the storage access operation is a first-type write request for providing temporary storage of the data;

in response to the storage access operation being the first-type write request, initiate a first program cycle to store the data as temporary data within one or more of the blocks of the non-volatile storage device, wherein the first program cycle has an associated first set of parameters for temporary storage that are different from a second set of parameters for permanent storage within the non-volatile storage device, and wherein the non-volatile storage device provides both permanent data storage and temporary data storage based on a type of write request received to store the data; and receive at the storage controller a plurality of temporary data parameters associated with at least a portion of the data, wherein the temporary data parameters comprise at least one of a first time period for temporary storage, a pre-established first number of errors permitted for temporary storage, and a selected storage operation of multiple operations that can be performed in response to the controller determining that the pre-established first number of errors permitted for temporary storage of the portion of data has been exceeded, wherein the temporary data parameters allow the storage controller to reduce a number of write cycles to store the portion of data, relative to the number of write cycles required for a permanent storage of data, and wherein the storage controller utilizes at least one page of the non-volatile storage device as a cache storage.

15. The information handling system of claim 14, wherein the firmware further configures the storage controller to:
perform a plurality of timed periodic first program cycles to store data as temporary data in order to prevent loss of data during the occurrence of a power failure in the solid state storage system; and
in response to detecting the power failure in the solid state storage system, execute the first program cycle to store all pending data to the storage device as temporary data.

16. The information handling system of claim 14, wherein the firmware further configures the storage controller to:
set a maximum number of pages for temporary data within the storage device; and
in response to receiving a write request to write a new page of temporary data:
count a number of pages of temporary data within the storage device; and
in response to the number of pages of temporary data being greater than the maximum number of pages of temporary data: determine a least recently used page of temporary data and write the least recently used page of temporary data as permanent data before writing the new page of temporary data.

* * * * *